United States Patent [19]

Tosaka et al.

[11] 4,399,113
[45] Aug. 16, 1983

[54] PROCESS FOR TREATING A GAS CONTAINING A FLUORINE COMPOUND

[75] Inventors: Susumu Tosaka, Joetsu; Tadamichi Abe, Tokyo; Hozumi Endo, Komae; Kiyohiro Ogawa, Joetsu, all of Japan

[73] Assignee: Mitsubishi Light Metal Industries Limited, Tokyo, Japan

[21] Appl. No.: 321,712

[22] Filed: Nov. 16, 1981

[30] Foreign Application Priority Data

Dec. 11, 1980 [JP] Japan .................... 55-174818

[51] Int. Cl.³ .............................. B01D 53/34
[52] U.S. Cl. .................... 423/240; 423/489; 423/556
[58] Field of Search ............ 423/240, 241, 489, 556

[56] References Cited
U.S. PATENT DOCUMENTS 4,041,137 8/1977 Abe et al. ...................... 423/240

FOREIGN PATENT DOCUMENTS 45-28289 9/1970 Japan .
54-128494 10/1979 Japan .................... 423/489
244317 5/1967 U.S.S.R. .

OTHER PUBLICATIONS

Light Metals 1975, vol. 2, pp. 269-286, "Simple Methods of Crystallizing Fluorides from Effluents of Aluminum Smelter Pot Gas Scrubbers".

Primary Examiner—Earl C. Thomas
Attorney, Agent, or Firm—Oblon, Fisher, Spivak, McClelland & Maier

[57] ABSTRACT

A process for treating a gas containing a fluorine compound which comprises the steps of contacting said gas with an aqueous solution as an absorbent containing aluminum fluoride and sulfate radical at a concentration of 3 to 30 g/l to absorb the fluorine compound, producing a solid phase including aluminum fluoride hydrate and/or basic aluminum fluoride by adding aluminum hydroxide and/or alumina to the resultant aqueous solution obtained in the absorbing step, and separating said solid phase from a slurry containing said solid phase obtained in the producing step.

7 Claims, 2 Drawing Figures

PROCESS FOR TREATING A GAS CONTAINING A FLUORINE COMPOUND

BACKGROUND OF THE INVENTION

1. Field of the Invention

The present invention relates to a process for treating a gas containing a fluorine compound with the main object of producing aluminum fluoride from the gas containing the fluorine compound in a high yield for a long period while maintaining a stable state.

2. Description of the Prior Art

In the case where a gas containing a fluorine compound, particularly a gas of low concentration of the fluorine compound such as exhaust gases from electrolytic furnace for aluminum production, which contain gaseous fluorine compounds, such as hydrogen fluoride, dihydrogen difluoride, and carbon fluoride, particulate (i.e. dusty) fluorine compounds such as cryolite and aluminum fluoride, as well as other gaseous and particulate compounds such as carbon dioxide, sulfur dioxide, alumina and carbon, and the like is treated by absorption with only water, not only the efficiency of absorption at the gas-liquid equilibrial surface is low but also it has been technically difficult to recover fluorine as aluminum fluoride because the concentration of fluorine in the thus obtained aqueous absorbing solution is low. As a countermeasure for the above-mentioned demerit, in the case where an absorbent including an aqueous solution containing water-soluble aluminum salt is used instead of water, the efficiency of absorption is improved and the concentration of fluorine in the absorbent is raised with the result of showing a considerable technical progress since the fluorine component in the gas is caught by the reaction with aluminum compound. However, as will be shown below, the industrial value of such a countermeasure is not necessarily high enough.

Namely, the process described in Japanese Patent Publication No. 28289/70 (hereinafter referred to as the first prior art) is a process wherein an aqueous solution containing aluminum sulfate and the like is used as an absorbent. According to the examination of the present inventors, since the concentration of sulfate radical in the above-mentioned absorbent is as high as 5 to 8% by weight, a part of or almost all of fluorine has come to be water-soluble salt such as $Al_2F_4SO_4$ and the like in the absorbing step. Accordingly, although the eduction and adhesion of solids hardly occur, the countermeasure has demerits of taking a long period for the production of aluminum fluoride hydrate and the like in the producing step of solid phase and hence of difficulty in industrialization.

Another process described in Japanese Patent Publication No. 21399/78 (hereinafter referred to as the second prior art) uses an aqueous solution containing aluminum fluoride or an aqueous solution containing aluminum fluoride and alumina or aluminum hydroxide as the absorbent for a gas containing a fluorine compound. According to the examination by the present inventors, since this absorbent does not contain sulfate radical, or even in the case where $SO_x$ (sulfur oxides) in the exhaust gas from electrolytic furnaces for aluminum production is considered, the concentration of $SO_x$ is ordinarily as low as 0.003 to 0.01%, and even in the case where the concentration of $SO_x$ is still higher, $SO_x$ is hardly absorbed by such an absorbent owing to the operating conditions, thus the concentration of sulfate radical in the absorbent is negligibly small normally as less than 0.1 g/l, hence water-soluble salts such as $Al_2F_4SO_4$ and the like are not produced in the absorbing step. Accordingly, the demerit of the first prior art of taking a long period for producing the solid phase has been solved by the second prior art, and in this case of the second prior art, the reaction of producing the solid phase proceeds easily. However, there is another side to the second prior art of the inevitable eduction and adhesion of solid matter in the absorbing step. Although it is possible to reduce the occurrence of eduction and adhesion of solid matter to a certain extent by a countermeasure of reducing the amount of addition of aluminum hydroxide or alumina to the absorbing solution to less than the theoretical amount, namely, by increasing the acidity of the absorbent so as to form acidic aluminum fluoride represented by the formula: $H_nAlF_{3+n}$ wherein $0 < n \leq 3$ in the solution, there is a demerit that it is difficult to operate the system under such consitions for a long period in a stable state.

As has been stated above, neither the first prior art nor the second prior art can be said to have been completed as an industrial process, besides with a very few instances of actual installation.

SUMMARY OF THE INVENTION

An object of the present invention is to provide an industrially profitable process for treating a gas containing a fluorine compound such as hydrogen fluoride. The process has solved the demerits in the prior arts. Another object of the present invention is to provide a process for treating a gas containing a fluorine compound with an intention of producing, for a long period with stability, mainly aluminum fluoride from the gas. According to the present invention, a process for treating a gas containing a fluorine compound, which comprises the steps of contacting said gas with an aqueous solution as an absorbent containing aluminum fluoride and sulfate radical at a concentration of 3 to 30 g/l to absorb the fluorine compound, producing a solid phase including aluminum fluoride hydrate and/or basic aluminum fluoride by adding aluminum hydroxide and/or alumina to the resultant aqueous solution obtained in the absorbing step, and separating said solid phase from a slurry containing said solid phase obtained in the solid phase producing step, is provided.

DETAILED DESCRIPTION OF THE INVENTION

Figure 1:
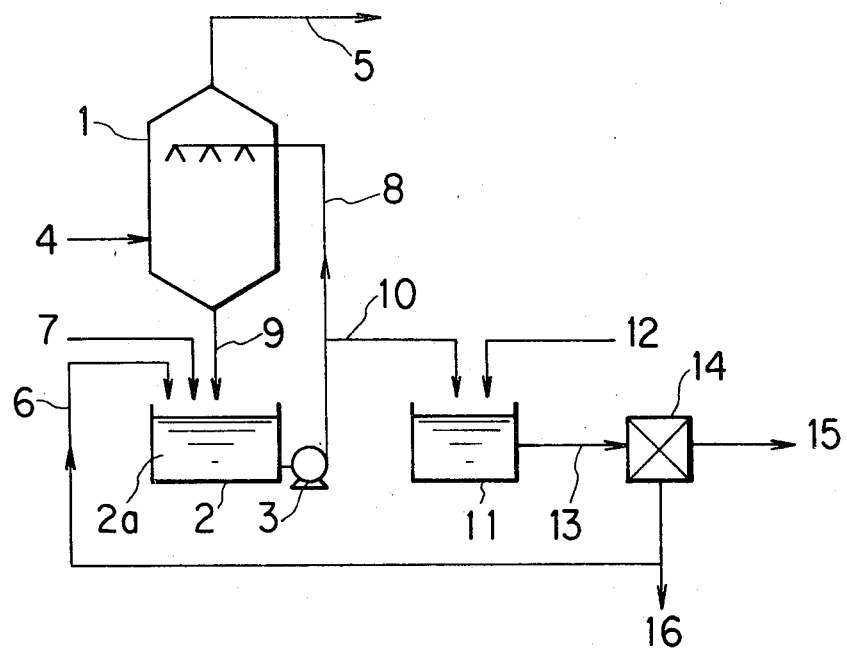
FIG. 1 shows a flow chart of an example of the present invention.

In order to carry out the treatment of a gas containing a fluorine compound by absorption in the absorbing step of the present invention in stabilized state and to produce aluminum fluoride efficiently, it is necessary that the concentration of sulfate radical in the absorbent is in a range of 3 to 30 g/l, preferably, 5 to 15 g/l. In the case of the concentration of sulfate radical of less than 3 g/l, the amount of eduction of aluminum fluoride trihydrate in the absorbent is so much that the long period stabilized operation cannot be carried out, and on the other hand, in the case of the concentration of sulfate radical of over 30 g/l, it takes a long period for the production of the solid phase in the producing step, that is, such cases are unsuitable for the process.

As the source of the sulfate radical, other than sulfuric acid and aluminum sulfate, amorphous (non-crystalline) aluminum hydroxide which is generated in the step of anodic oxidation treatment of aluminum material and known as "neutralization sludge" (hereinafter referred to as aluminum hydroxide sludge) is particularly suitable.

On the other hand, sodium sulfate, potassium sulfate, calcium sulfate and the like respectively produce a solid phase of sodium aluminum fluoride, potassium aluminum fluoride, calcium fluoride and the like in the absorbing step, and the presence of the thus produced compound as the solid phase in the absorbent not only hinders the gas-absorbing operation but also reduces the quality of the product of the whole process, namely, aluminum fluoride. Accordingly, the above-mentioned sulfates are unsuitable for use as the source of sulfate radical.

The process of the present invention comprises, as has been stated, the step of absorbing ("absorbing step"), the step of producing solid phase ("producing step") and the step of separating solid-liquid phases ("separating step"), and these steps will be explained in detail one after another as follows.

(A) Absorbing Step

In the absorbing step, the gas containing a fluorine compound is introduced into the absorption section of an apparatus, to which the absorbent including an aqueous solution containing 3 to 30 g/l of sulfate radical and aluminum fluoride is sprayed for treating the gas. The absorbent is an aqueous solution of aluminum fluoride from the step of separating solid-liquid phases, or an aqueous solution of aluminum fluoride to which a sulfate radical-containing substance, for instance, aluminum sulfate, sulfuric acid, the aluminum hydroxide sludge, etc. has been added.

The absorption of the gas in the absorbing section is exemplified by chemical reaction formulae (I) and (II) as follows:

$$nHF(gas) + AlF_3(solution) \rightarrow H_nAlF_{3+n}(solution) \quad (I)$$

wherein $0 < n \leq 3$.

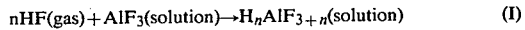

$$12HF(gas) + Al_2(SO_4)_3(solution) + 4Al(OH)_3(amorphous) \rightarrow 3Al_2F_4SO_4(solution) + 12H_2O \quad (II)$$

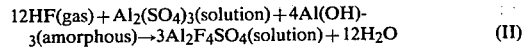

In the operation of gas-absorption, mainly the reaction according to the formula (I) is carried out and the reaction according to the formula (II) is secondary. Accordingly, the main component during the operation of the absorbing solution is acidic aluminum fluoride ($H_nAlF_{3+n}$, wherein $0 < n \leq 3$) and as the minor components aluminum fluoride sulfate ($Al_2F_4SO_4$) and the like are contained in the solution.

On continuing the treatment of absorption of the gas containing the fluorine compound in the absorption section while recycling the absorbent in a tank by a pump, the concentration of fluorine in the absorbent is raised. Therefore, in order to maintain the concentration of fluorine in the absorbent in a range of 30 to 150 g/l, more preferably, 50 to 120 g/l, a part of the absorbent is withdrawn and sent to the step of producing solid phase. In addition, in order to maintain n in the formula $H_nAlF_{3+n}$ in the relationship of $0 < n \leq 3$, the aqueous solution of aluminum fluoride from the step of separating solid-liquid phases is supplied to the tank provided with a pump.

In the case where a fluorine component still remains in the treated gas in the absorbing step, and it is necessary to further treat the once-treated gas, another absorbing section may be installed next to the already-installed absorbing section so as to be connected to the already installed absorbing section, and while using an absorbent of pH 1 to 4 consisting of an aqueous solution of aluminum fluoride containing the added aluminum hydroxide sludge, a similar operation of absorption is carried out therein. In this case, the already installed section and the newly installed section are referred to as the former absorbing section and the latter absorbing section, respectively.

Absorption of the gas in the latter absorbing section is exemplified by a chemical reaction formula (III) as follows:

$$3HF(gas) + Al(OH)_3(amorphous) \rightarrow AlF_3(solution) + 3H_2O \quad (III)$$

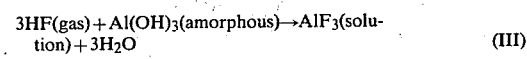

Other than the reaction (III), the reaction (II) which is carried out in the former absorbing section is also carried out in the latter absorbing section.

The characteristic feature of the latter absorbing section is that since the aluminum hydroxide sludge is readily soluble into the absorbent, it is possible to bring the component of the absorbent into a state of aluminum-excess than that of aluminum fluoride ($AlF_3$), for instance, the state wherein the molar ratio of F/Al may be maintained at a value of 2 to 3 even if the pH of the absorbent is 1 to 4.

Since in the thus formed state, the concentration of a fluorine compound in the gas phase at gas-liquid equilibrium is substantially zero, it is possible to catch the fluorine component in the treated gas nearly completely at the latter absorbing section.

On continuing the operation of the latter absorbing section, the concentration of fluorine in the absorbent is gradually raised, and accordingly, a part of the absorbent is withdrawn and combined with the absorbent of the former absorbing section in order to maintain the concentration of fluorine in the absorbent in the latter absorbing section lower than 100 g/l, more preferably, lower than 50 g/l. The thus combined absorbent absorbs the fluorine-containing gas in the former absorbing section according to the reaction of the chemical reaction formula (I).

In the case where the latter absorbing section is installed as above, the supply of the sulfate radical-containing substance to the former absorbing section may be omitted. In addition, the amount of the aluminum hydroxide sludge supplied to the latter absorbing section is adjusted so as to maintain the pH of the absorbent in the latter absorbing section in the range of 1 to 4, preferably 1.5 to 3.0.

(B) Producing Step

In the case where aluminum hydroxide is added to the absorbent withdrawn from the absorbing step in the reactor, an aqueous solution of aluminum fluoride is formed according to the chemical reaction formula (IV):

$$H_nAlF_{3+n}(solution) + n/3 Al(OH)_3 \rightarrow (1+n/3)AlF_3(solution) + nH_2O \quad (IV)$$

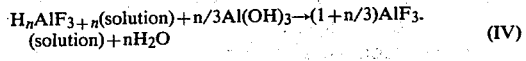

wherein $0 < n \leq 3$.

Although any form of aluminum hydroxide may be used for that purpose, crystalline aluminum hydroxide marketed in general is practical. The thus prepared aqueous solution of aluminum fluoride becomes to a slurry in which the fluorine portion in the aqueous solution has been converted into solid aluminum fluoride trihydrate following the chemical reaction formula (V):

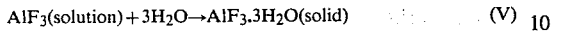

$$AlF_3(solution) + 3H_2O \rightarrow AlF_3 \cdot 3H_2O(solid) \qquad (V)$$

Since the mother liquor of the slurry is used as the absorbent in the absorbing step, it should still contain the dissolved aluminum fluoride, and accordingly, it is necessary to adjust the degree of progress of the solid-producing reaction, and by combining the reaction conditions suitably in the temperature range of 40° to 90° C. and the range of reaction time of 1 to 8 hours, the degree of progress of the reaction can be optionally adjusted.

In the case where, in the reaction of the formula (IV), aluminum hydroxide is added more than the equivalent ratio, basic aluminum fluorides other than aluminum fluoride trihydrate are produced in the reaction for producing solid phase, the chemical formula being, for instance, 16 $AlF_{1.65}(OH)_{1.35} \cdot 6H_2O$ and $AlF_{1.95}(OH)_{1.05}$ and the like.

The thus obtained slurry at the time of completing the reaction of production of solid phase, namely, an aqueous solution of aluminum fluoride containing solid aluminum fluoride trihydrate is transferred to the separating step to be treated.

(C) Separating Step

In this step, solid matter is separated from the thus transferred slurry and then the separated solid matter is treated in another step for preparing the product of aluminum fluoride, and the mother liquor is transferred to the absorbing step to be used as the absorbent. If necessary, a part of the mother liquor is withdrawn to be treated in another step.

Concerning the position to which the above-mentioned aluminum hydroxide is supplied, either the absorbing step or the producing step is optional, however, from the view point of operation management, it is preferably supplied to the producing step. Because, there are cases of the local occurrence of reaction of solid phase-production and of the presence of not-yet dissolved solid phase in the absorbent, in the case where aluminum hydroxide is supplied to the absorbing step.

The present invention will be more concretely explained while referring to the non-limitative examples, which should not be construed as a limitation thereof.

EXAMPLE 1

The present example is described while referring to FIG. 1 which shows the flow chart of the present example.

A waste gas containing 564.5 mg/Nm³ of fluorine in the form of gaseous fluorine compounds (mainly hydrogen fluoride) and 12.5 mg/Nm³ of fluorine in the form of particulate fluorine compounds (mainly cryolite) as well as other dust such as alumina, the total amount of dust including particulate fluorine compounds being 53.9 mg/Nm³, was treated in the present example. In FIG. 1, the waste gas to be treated was introduced through the line 4 into the absorption section 1, and after carrying out the treatment of absorption in the absorption section 1 by the absorbent 2a supplied from the absorbent tank 2 by a pump 3 via the line 8, the treated waste gas was exhausted from the top of the absorption section 1 via the line 5. On the other hand, the absorbent 2a which had absorbed the fluorine component was returned to the tank 2 via the line 9. The temperature of the absorbent 2a returned to the tank 2 was 35° to 40° C. during the operation.

The aqueous solution of aluminum fluoride was supplied to the tank 2 via the line 6 and the substance containing sulfate radical such as aluminum sulfate, the aluminum hydroxide sludge and the like was supplied to the tank 2 via the line 7. The amount of aluminum fluoride in the aqueous solution of aluminum fluoride supplied via the line 6 to the tank 2 was adjusted so that the absorbent 2a was maintained in a state of an aqueous solution of acidic aluminum fluoride ($H_nAlF_{3+n}$, wherein $0 < n \leq 3$), and the amount of the substance containing sulfate radical supplied via line 7 to the tank 2 was adjusted so that the concentration of sulfate radical in the absorbent 2a was maintained at 10 g/l.

The concentration of fluorine in the absorbent 2a depended on the amount of the fluorine-containing gas introduced via the line 4, the retained amount of the absorbent 2a and the amount of the part of the absorbent withdrawn from the main flow of the absorbent 2a in the absorption section 1 and supplied to the producing step via the line 10, and the concentration of fluorine was adjusted in a range of 60 to 80 g/l.

The operation of gas-treatment by absorption carried out under the thus adjusted concentration of fluorine in the absorbent 2a was very stable and it was possible to operate the apparatus for more than 6 months.

On adding aluminum hydroxide supplied via the line 12 into the part of the absorbent 2a withdrawn from the tank 2 via the line 8 and introduced into the reactor 11 via the line 10, and bringing the thus prepared mixture into reaction in the reactor 11 at 60° C. for 0.5 hours while stirring, acidic aluminum fluoride in the mixed liquid was completely converted into aluminum fluoride. On continuously stirring the reaction mixture for additional 3.5 hours, 50% by weight of fluorine in the mixed liquid was converted into solid aluminum fluoride trihydrate, and the remainder was still held in the liquid state. The remaining amount was nearly the same as that required in the absorption section 1.

The slurry in the reactor 11 containing the thus produced aluminum fluoride trihydrate was supplied to the solid-liquid separator 14 via the line 13, and aluminum fluoride trihydrate which was separated in the separator 14 was taken out from the line 15. The mother liquor separated in the separator 14, namely, aqueous solution of aluminum fluoride, was recycled to the absorbent tank 2 via the line 6. A part of the mother liquor was withdrawn via the line 16.

COMPARATIVE EXAMPLE 1

The flow chart of the present comparative example was the same as that in Example 1, and accordingly, is shown in FIG. 1. In the present comparative example, the operation was carried out in the same manner as in Example 1 except for that the supply of sulfate radical-containing substance via the line 7 was not carried out. A different result from Example 1 was obtained as follows:

From just after the commencement of the operation, solid aluminum fluoride trihydrate began to appear within the absorbent 2a which was accordingly, turned into a slurry-like state. On further continuing the operation, aluminum fluoride trihydrate adhered to the inner surfaces of the absorption section 1, the tank 2, the pump 3 and the line 8, and accordingly, it was necessary to stop the operation at least once a month and to remove the thus adhered substance.

On the other hand, the reaction of solid phase-production in the reactor 11 proceeded easily, and 80% by weight of fluorine was converted into aluminum fluoride trihydrate and the remaining amount (20% weight) was remained in the liquid phase. In this case, since the amount of aluminum fluoride in the absorbent 2a was insufficient in the operation of the absorption section 1, the reaction time period in the reactor 11 was limited to one hour to adjust the situation wherein 50% by weight of fluorine was converted into aluminum fluoride trihydrate. However, owing to the large reactivity, aluminum fluoride trihydrate adhered to the inner surfaces of the line 13, the solid-liquid separator 14, the line 6 and the like, and accordingly, it was necessary to stop the operation and to remove the adhered substance frequently. Withdrawal of the mother liquor 2a via the line 16 was not carried out.

COMPARATIVE EXAMPLE 2

The flow chart of the present comparative example was the same as that in Example 1 shown in FIG. 1. In the present comparative example 2, the operation was carried out in the same manner as in Example 1 except for that the sulfate radical-containing substance was not supplied and that the concentration of fluorine in the absorbent 2a was made to 52 to 72 g/l which was lower than the concentration in Example 1 by 8 g/l corresponding to 10 g/l of the concentration of sulfate radical (of the state of $Al_2F_4SO_4$) in Example 1. The result of the operation was the same as that in Comparative Example 1.

COMPARATIVE EXAMPLE 3

The flow chart of the present comparative example was the same as that in Example 1 shown FIG. 1. In the present comparative example 3, the operation was carried out in the same manner as in Example 1 except for that the sulfate radical-containing substance was not supplied and that the concentration of fluorine in the absorbent 2a was maintained at 30 to 40 g/l. The results were nearly the same as those in the comparative example 1.

On evaluating the effect of the present invention shown in Example 1, that is, the effect of making sulfate radical present in the absorbent by examination of the results in Comparative Examples 1, 2 and 3, it has been found that the effect of the present invention is high in industrial value as follows:

(1) In the aqueous solution as an absorbent in the absorbing step at a nearly ordinary temperature of 35° to 40° C., there is an effect of reducing the apparent concentration of $AlF_3$ by a larger margin than the degree of reduction of the possibility of eduction of solid phase, corresponding to the amount of production of $Al_2F_4SO_4$ which is highly soluble in water. Accordingly, stable operation is possibly carried out for a long period without eduction and adhesion of the above-mentioned solid matter in the absorbing step according to the present invention, even in a range of so high concentration of fluorine in the absorbent that the eduction and adhesion of solid matter occur to prevent the operation of the system when sulfate radical is not present as in Comparative Examples 1, 2 and 3.

(2) In the producing step, addition of $Al(OH)_3$ makes the concentration of $AlF_3$ in the absorbent higher than that before addition of $Al(OH)_3$ because of the conversion of $H_nAlF_{3+n}$ to $AlF_3$ and induces the easier eduction of $AlF_3.3H_2O$. This tendency is accelerated by the raise of the temperature of the absorbent. However, by the suitable adjustment of the concentration of sulfate radical in the absorbent in a suitable range, not only the control of the rate of production of the solid phase becomes easy but also the troubles in the operation of the apparatus can be avoided.

COMPARATIVE EXAMPLE 4

The flow chart of the present comparative example is the same as in Example 1, and accordingly is shown in FIG. 1. The operation in Comparative Example 4 was carried out in the same manner as in Example 1 except for that the concentration of sulfate radical in the absorbent 2a was 50 g/l. The thus obtained result was different from that of Example 1 as follows:

(1) Since the reaction of production of the solid phase in the reactor 11 hardly showed any progress, the temperature of the liquid in the reactor was raised to 80° C. and the stirring was continued further for 6 hours. However, only 10% by weight of fluorine in the liquid was converted to $AlF_3.3H_2O$, and the remainder maintained as it was in a liquid phase.

(2) In consideration of the whole mass-balance, the amount of mother liquor withdrawn from the line 16 became too large.

EXAMPLE 2

Figure 2:
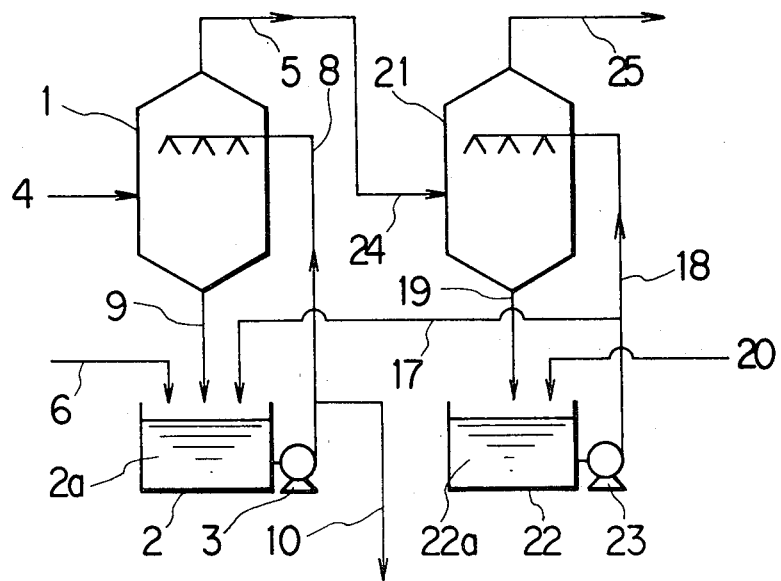
FIG. 2 shows only the flow chart of the absorbing step in another example of the present invention.

Except for the absorbing step, the process of Example 2 was the same as in Example 1 shown in FIG. 1 by the flow chart, and the flow chart of the absorbing step of Example 2 is shown in FIG. 2 with the proviso that the same number in FIG. 2 as that in FIG. 1 indicates the same apparatus as in FIG. 1. For reference, although the step next to the line 10 is omitted in FIG. 2, the step was the same as in Example 1 shown in FIG. 1. In addition, in Example 2, the absorption section 1 of Example 1 is referred to as "the former absorption section 1" in Example 2.

Example 2 differs from Example 1 as follows:

In FIG. 2, the treatment of the gas containing a fluorine compound was carried out in the former absorption section 1 by the absorbent 2a, and the once treated gas still containing the fluorine compound discharged from the line 5 was further introduced into the latter absorption section 21 via the line 24. The thus introduced gas was treated in the latter absorption section 21 by absorption with the absorbent 22a supplied by the pump 23 via the line 18 from the absorbent tank 22. After that, the treated gas was discharged to atmosphere via the line 25, and the absorbent 22a was returned to the tank 22 via the line 19.

On the other hand, the aluminum hydroxide sludge was supplied to the tank 22 via the line 20 while adjusting the flow rate to maintain the pH of the absorbent 22a at 1.5 to 2.0.

The concentration of fluorine in the absorbent 22a depended on the amount of fluorine component in the gas introduced via the line 24, the required amount of the absorbent and the withdrawn amount of the absorbent 22a supplied to tank 2 via the line 17, and the concentration of fluorine was adjusted in the range of 30 to 40 g/l.

In the present Example 2, the supply of the substance containing sulfate radical carried out in Example 1 via the line 7 was not necessary.

On operating the treatment of the gas containing a fluorine compound as shown above, it was able to carry out the extremely stabilized operation for a long term as in Example 1.

What is claimed is:

1. A process for treating a gas containing a fluorine compound which comprises the steps of:
   contacting said gas with an aqueous solution as an absorbent containing aluminum fluoride and sulfate radical at a concentration of 3 to 30 g/l to absorb the fluorine compound,
   producing a solid phase including aluminum fluoride hydrate and/or basic aluminum fluoride by adding aluminum hydroxide and/or alumina to the resultant aqueous solution obtained in the absorbing step, and
   separating said solid phase from a slurry containing said solid phase obtained in the producing step.

2. The process according to claim 1, wherein the concentration of the sulfate radical contained in the aqueous solution as an absorbent is maintained at a predetermined value by adding a substance containing sulfate radical in the absorbent in the absorbing step.

3. The process according to claim 2, wherein the substance containing sulfate radical is sulfuric acid or aluminum sulfate.

4. The process according to claim 2, wherein the substance containing sulfate radical is amorphous aluminum hydroxide containing sulfate radical.

5. The process according to claim 1, wherein the absorbing step comprises a former absorbing step wherein the gas containing a fluorine compound is treated with an aqueous solution as a former absorbent containing aluminum fluoride and sulfate radical at a concentration of 3 to 30 g/l, and a latter absorbing step wherein the once treated gas containing the fluorine compound discharged from the former absorbing step is further treated with an aqueous solution as a latter absorbent of pH 1 to 4 containing amorphous aluminum hydroxide.

6. The process according to claim 5, wherein amorphous aluminum hydroxide to be added to the latter absorbent contains sulfate radical.

7. The process according to claim 5 or 6, wherein a part of the latter absorbent is withdrawn and the withdrawn part thereof is combined with the former absorbent.

* * * * *